UNITED STATES PATENT OFFICE.

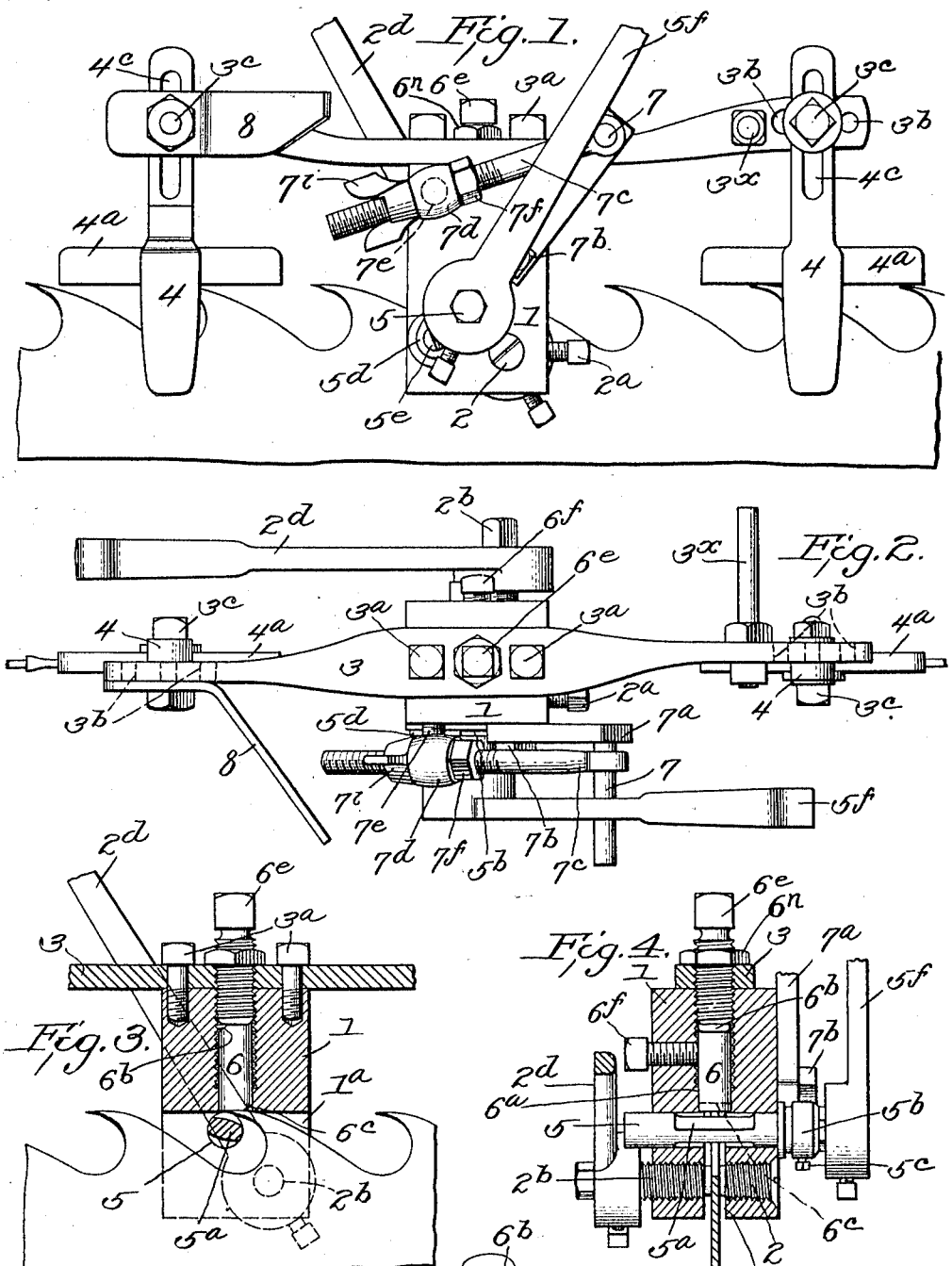

DAVID H. BALL, OF SOUTH WILLIAMSPORT, PENNSYLVANIA.

SAW-SWAGE.

1,061,156.  Specification of Letters Patent.  Patented May 6, 1913.

Application filed October 1, 1912. Serial No. 723,425.

*To all whom it may concern:*

Be it known that I, DAVID H. BALL, of South Williamsport, in the county of Lycoming and State of Pennsylvania, have invented certain new and useful Improvements in Saw-Swages; and I hereby declare that the following is a full, clear, and exact description thereof, reference being had to the accompanying drawings, which form part of this specification.

This invention is an improved machine for swaging tension band gang and circular saws; and its object is to provide machines which will effectively swage the teeth of the saw without stretching the edge of the saw; and put more tension in the saw without injuring the set thereof; and which can be applied to a saw and operated easily and quickly.

The invention consists in the novel construction of the machine as hereinafter described and claimed, and as illustrated in the accompanying drawings.

In said drawings—Figure 1 is a side elevation of the device from the swaging lever side. Fig. 2 is a plan view of Fig. 1. Fig. 3 is a detail longitudinal section. Fig. 4 is a detail transverse section. Fig. 5 is a detail view of the anvil.

The machine comprises a square block 1, preferably made of steel, having a vertical longitudinal slot $1^a$ in its lower part in which the saw teeth to be swaged can be entered. At one side of the slot and extending transversely of the block is a clamping bolt 2 which is threaded into a corresponding hole in the block, near the lower end thereof, and this bolt can be locked in adjusted position by means of a tap bolt $2^a$. Directly opposite this clamp bolt, and in axial alinement therewith is a similar screw $2^b$ which is tapped through a corresponding opening in the block, and has on its outer end a handle $2^d$ by which the bolt $2^b$ can be turned. When the machine is placed in position over the edge of a saw, shown in the drawing, so that a tooth of the saw enters slot $1^a$, by turning the handle $2^d$ the block 1 is securely clamped to the saw, the saw blade being held between the inner ends of the bolts 2 and $2^b$, see Fig. 4. The opening movement of the lever $2^d$ may be limited by means of a stop pin $3^x$ attached to one side of a bar 3 which is detachably attached to the top of the block 1 by means of bolts $3^a$ tapped through the bar into the upper end of the block as shown. The ends of the bar 3 are provided with a series of openings $3^b$ with which are detachably engaged removable bolts $3^c$ which also engage slots $4^c$ in setting bars 4, which are slotted at their lower ends to fit over the edge of the saw, and are provided with transversely extending bars or fingers $4^a$ which are adapted to rest upon the teeth of the saw and thus help to support the block 1 and sustain it in proper operative position when applied to the tooth of the saw. The setting bars 4 can be adjusted to different positions, so as to properly locate the block on the saw, by reason of the adjustable connection of the bolts $3^c$ to bar 3 and the slots $4^c$ in bars 4 as is obvious.

When the device is properly positioned on the edge of the saw the bolts 2, $2^b$ engage the saw below the base of the teeth (see Fig. 3) and thus clamp the body of the saw and do not have any distorting effect upon the teeth, and will not stretch the edge of the saw; and thus saves labor for the filer, and enables the saw to run better and do more work. By using my swage the ends of the saw teeth are made flat and level and widened slightly so the saw will cut easily and smoothly and will do fine work and have greater capacity; and the saws will run about three times as long when swaged with my machine as they would by ordinary sharpening.

Extending transversely through the block 1, and journaled in suitable bearings therein is a swaging shaft 5 which lies near the upper end of the slot $1^a$; said shaft is provided with a cam-shaped or flattened portion $5^a$ which is adapted to coöperate with an anvil 6 in the block. On shaft 5 is a grooved collar $5^b$ which is adjustably secured to the shaft by a screw $5^c$. The groove of this collar is engaged by a plate $5^d$, secured to the block by a screw $5^e$, so that while the swaging shaft can be rocked it is kept from longitudinal motion; but the swaging shaft can be adjusted longitudinally, by shifting the collar $5^b$ thereon, so as to bring a fresh portion of the swaging surface $5^a$ into operative position. The swaging shaft is provided with a handle $5^f$ on one end by which it can be operated.

The anvil 6 consists of a substantially cylindric hard steel pin (Fig. 5) which is flattened on one side, as at $6^a$, and beveled on its ends, as shown at $6^b$, $6^c$. This anvil can be adjusted and either end brought into working position opposite the swage 5ª; and the bevels 6ᵇ, 6ᶜ provide additional working faces which can be brought into operative position as required, so as to bring a sharp edge opposite the swaging die. The anvil of course has to be removed from the hole and properly turned and then re-inserted. When in position the working face of the anvil comes opposite the swaging shaft or die 5ª at the upper end of the slot 1ª, and when applying the machine to the tooth of a saw the swaging shaft should be turned so as to leave a slight space between it and the anvil (see Fig. 3) into which the end of the saw tooth to be sharpened can be entered; then by turning the swaging shaft the end of the tooth is swaged between the swage shaft or die 5ª and the anvil 6 in the well known manner. The anvil can be adjusted vertically to proper working position by means of a bolt 6ᵉ tapped through the bar 3 into the upper end of the block 1 above the anvil; the inner end of the bolt 6ᵉ engaging the upper end of the anvil; and bolt 6ᵉ can be locked by a jam-nut 6ⁿ. The anvil is firmly held in position against rotatorial movement by means of a bolt 6ᶠ tapped through a suitable opening in the side of the block and engaging the flat side 6ª of the anvil.

In order to limit the swaging action of the die 5ª and make it uniform on all teeth an adjustable stop is provided; this consists of a pin 7 fixed on one end of a bar 7ª the other end of which is pivoted on a bolt 7ᵇ tapped into the block 1; thus allowing the bar to swing. The pin 7 is engaged by the eye of an eye-bolt 7ᶜ the shank of which extends through an eye 7ᵈ on a bolt 7ᵉ tapped into the side of the block 1. The eye-bolt 7ᶜ is threaded and is provided with an adjusting nut 7ᶠ and wing-nut 7ⁱ by means of which the stop pin 7 can be accurately adjusted so that it will be engaged by the handle 5ᶠ and limit the extent of swaging movement of the swaging shaft 5. The return movement of the shaft 5 may be limited by means of a stop finger 8 attached to the bar 3 as shown.

As shown in Fig. 3 the machine is applied to the toothed edge of the saw and the point of the tooth to be swaged is inserted between the anvil and the swage die while the latter is in open position, the anvil having been previously adjusted to the desired point and the stop 7 having also been adjusted so as to limit the movement of the swaging die; then when the lever 5ᶠ is grasped and turned the swaging die 5ª engages the under side of the end of the tooth and pinches the latter powerfully against the anvil 6ᵇ and swages the point. By adjusting the stop pin 7 the extent of swaging movement of the die 5ª can be limited to any desired extent. The clamping of the saw below the base of the teeth is an important practical feature of the invention, as it holds the device firmly and at the same time prevents lateral distortion of the teeth or cutting edge of the saw during the swaging operation and thus prevents stretching of the saw edge.

What I claim is:

1. In a swaging machine, the combination of a block provided with a slot for the entrance of the saw tooth to be swaged, means for clamping the saw, an anvil adapted to engage one edge of a saw tooth, and a transverse swaging shaft adapted to engage the other edge of the tooth; with a lever for operating said shaft; and means for limiting the swaging movement of said lever consisting of a stop pin, a pivoted lever carrying the stop pin, a lever adjusting bolt pivotally connected to the said pin, and means for adjusting said lever adjusting bolt.

2. In a swaging machine, the combination of a block provided with a slot for the entrance of the saw teeth to be swaged, means for clamping the saw, an anvil in said block, a transverse swaging shaft in said block below the anvil, a lever for operating said shaft, a stop pin, a pivoted lever carrying the stop pin, a bolt pivotally connected to the said pin, an eye-bolt attached to the block engaged by said lever adjusting bolt, and nuts on said lever adjusting bolt at opposite sides of the eye-bolt.

In testimony that I claim the foregoing as my own, I affix my signature in presence of two witnesses.

DAVID H. BALL.

Witnesses:
J. MILTON FUREY,
E. A. BALL.

Copies of this patent may be obtained for five cents each, by addressing the "Commissioner of Patents, Washington, D. C."